United States Patent
Kalif

(10) Patent No.: US 9,022,676 B2
(45) Date of Patent: May 5, 2015

(54) WRITING UTENSIL WITH TWO HANDLES FOR WRITING WITH BOTH HANDS SIMULTANEOUSLY

(71) Applicant: Dorin Kalif, Kfar Vradim (IL)

(72) Inventor: Dorin Kalif, Kfar Vradim (IL)

(*) Notice: Subject to any disclaimer, the term of this patent is extended or adjusted under 35 U.S.C. 154(b) by 0 days.

(21) Appl. No.: 14/050,364

(22) Filed: Oct. 10, 2013

(65) Prior Publication Data

US 2014/0037361 A1 Feb. 6, 2014

Related U.S. Application Data

(63) Continuation-in-part of application No. 12/591,080, filed on Nov. 6, 2009, now abandoned.

(60) Provisional application No. 61/198,705, filed on Nov. 10, 2008.

(51) Int. Cl.
| | |
|---|---|
| A46B 5/02 | (2006.01) |
| B43K 29/00 | (2006.01) |
| G09B 19/00 | (2006.01) |
| B43K 23/004 | (2006.01) |
| B43K 23/008 | (2006.01) |
| G09B 11/02 | (2006.01) |

(52) U.S. Cl.
CPC ............ *B43K 29/00* (2013.01); *G09B 19/00* (2013.01); *B43K 23/004* (2013.01); *B43K 23/008* (2013.01); *G09B 11/02* (2013.01)

(58) Field of Classification Search
USPC .......................................... 401/6–8, 131, 195
See application file for complete search history.

(56) References Cited

U.S. PATENT DOCUMENTS

| | | | | |
|---|---|---|---|---|
| 5,308,179 | A | * | 5/1994 | Whitright ................ 401/131 |
| 6,086,445 | A | * | 7/2000 | Zawitz .................... 401/195 |
| 7,661,896 | B2 | * | 2/2010 | Zawitz ........................ 401/6 |
| 2007/0196158 | A1 | * | 8/2007 | Roche et al. ................ 401/7 |

* cited by examiner

*Primary Examiner* — Tuan N Nguyen

(57) ABSTRACT

A symmetric rigid writing device comprises two arms and a writing utensil. The writing utensil is permanently attached to the arms. The arms and the writing utensil are made of rigid materials. The arms are symmetric and the writing utensil is positioned at the center between the arms. Each of the arms is shaped like a curved pole. At least one end of each arm is attached to the writing utensil. The user may grasp the writing device by the arms with both hands and execute a writing action.

2 Claims, 3 Drawing Sheets

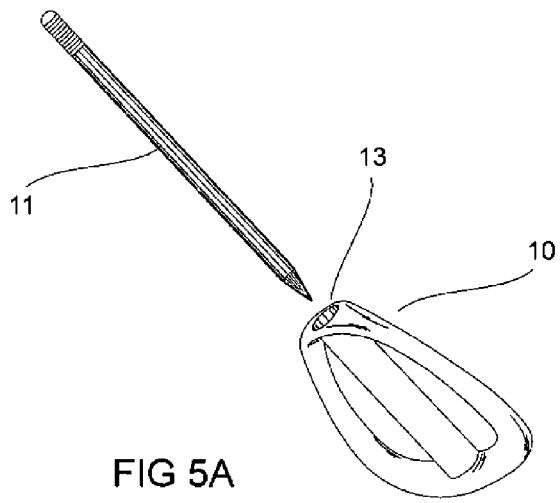
FIG 5A
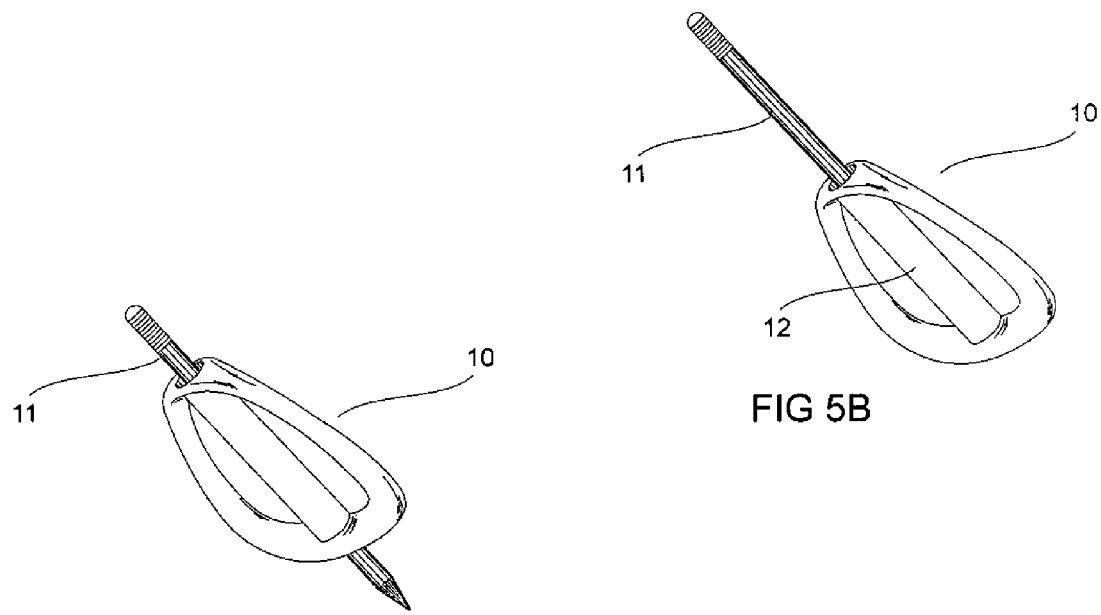
FIG 5B
FIG 5C

WRITING UTENSIL WITH TWO HANDLES FOR WRITING WITH BOTH HANDS SIMULTANEOUSLY

RELATED APPLICATIONS

This application is a continuation in part of U.S. patent application Ser. No. 12/591,080 filed on 6 Nov. 2009 which claimed priority of a U.S. Provisional Patent Application 61/198,705 filed on 10 Nov. 2008.

TECHNICAL FIELD

The present invention refers to a writing utensil with two handles, whereby the user writes while gripping the writing utensil with two hands simultaneously.

BACKGROUND ART

Operations that a person executes using his or her hands are controlled mainly by the brain, and it is also known that such operations are assimilated into the brain. The use of each of our hands is controlled by and assimilated into the opposite side of the brain, in other words, the use of the right hand is mainly influenced by and assimilated into the left-hand side of the brain, and vice versa. These principles are known to all specialists engaged in brain research and in the study of mutual, reciprocal influences between hand action and brain action. Mutual influence between the brain and the hands also exists when we use writing utensils, such as a pen or pencil, mainly when we write or draw. The present invention refers to a writing utensil designed to be used with both hands simultaneously.

DESCRIPTION OF THE DRAWINGS

FIGS. 5A-5C describe how to insert a standard pen (11) into the cavity (13) of the handle (10).

THE INVENTION

Figure 1:
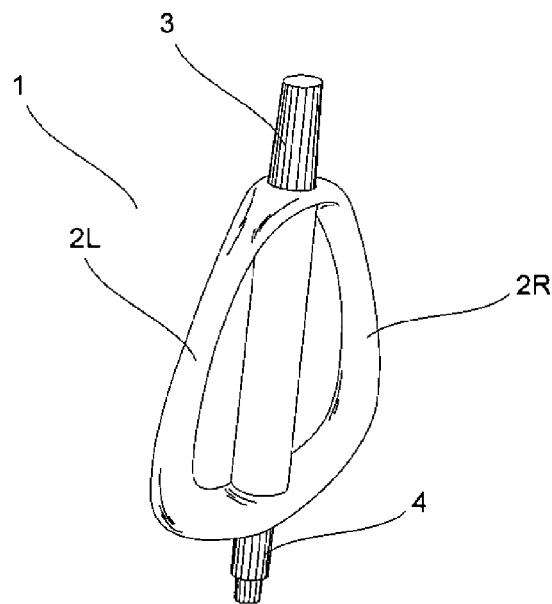
FIGS. 1 through 3 depict the pen (1).

The present invention refers to a symmetric rigid writing device (1) with two arms (2L) (2R), that constitutes as a handle of the writing device (1), whereby the user grips the writing device (1) with both hands while writing. The writing device (1) includes a writing utensil (3) that can be a pen, a pencil, a marker, and so on, and for convenience sake only we may use the word "pen" here to refer to the writing utensil (3), subject of the invention. In addition, the word "pen" in this patent application also refers to other kinds of writing utensil such as sticks, that do not include ink or any other painting materials, that are used for 'writing' on a computer touch screen, playing boards and such kind of articles.

The first embodiment of the present invention refers to a symmetric rigid writing device (1) that comprises a writing utensil (3) which serves as a central part of the writing device (1) and which is actually the body of the writing device (1). The writing utensil (3) ends with a bottom tip (4), which is the part that actually writes. Two arms (2L) (2R) protrude from either side of the writing utensil (3). The user grips the writing device (1) with both hands, holding one arm (2R) with the right hand and the other arm (2L) with the left hand.

Drawing No. 1 depicts the arms (2R) (2L), which are shaped like a closed arc. Nevertheless, it is emphasized that the arms (2L) (2R) can be made in a large variety of shapes and the depiction of the arms (2L) (2R) in Drawing No. 1 does not limit the scope of the implementation of the invention and its protection. Drawing No. 2 depicts the writing device (1) whereby the two arms (2L) (2R) are shaped like open arms that are attached to the writing utensil (3) of the writing device (1) and extend outwards, curving upward. In addition, the arms (2L) (2R) can come in a variety of sizes. Drawing No. 3 depicts the writing device (1) with relatively large arms (2L) (2R).

The second embodiment of the present invention refers to a symmetric and rigid handle (10), a general view of which is depicted in Drawing No. 4. The handle is designed so as to be inserted over a standard writing utensil, such as a pen, a pencil, a marker, and so on. The handle (10) together with the standard writing utensil constitute the aforementioned writing device (1), subject of the first embodiment of the invention. The handle (10) comprises a central part (12) that is shaped like a cylinder with a vertical cavity (13) and two arms (14R) (14L). The standard pen is inserted into the cavity (13). The shape of the cavity (13) and the materials that the handle (10) is made of cause the standard pen to fit snuggly into the handle (10) and thus facilitate the writing operation.

Using the symmetric rigid writing device (1) can solve and even prevent the development of writing-related problems that occur particularly in children. We mention here two examples of such problems: (a) Children who for various physiological and environmental considerations have yet to choose a dominant writing hand; and (b) children who have chosen a dominant writing hand that is not the hand designated for writing in terms of their innate brain lobe designation. These are the underlying causes of many of the problems children have in the acquisition of learning skills. The source of these problems may be diagnosable factors, such as a lazy eye (amblyopia), squinting, and motor skill deficiencies, or latent factors that are unknown even to scientists.

Using the symmetric rigid writing device (1), subject of the invention, encourages focusing of vision and creates hand-eye coordination involving both eyes and both hands simultaneously. This prevents the child from choosing the "wrong" hand for writing, which is the main cause of writing problems. Using the symmetric rigid writing device (1) also connects the two sides of the brain and alleviates problems created by using the "wrong" hand. Using the symmetric rigid writing device (1), or in other words writing with both hands, enables the child to sit in a symmetric position in which the body is not leaning in any one direction. This contributes to maximum comfort when writing and enhances the writer's mental concentration and focus, leading in turn to more efficient learning through writing.

Figure 2:
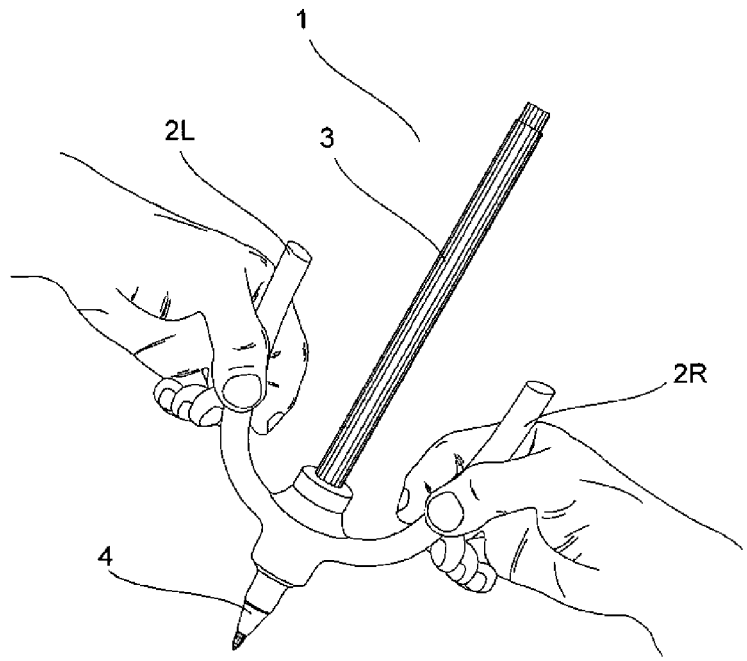
Figure 3:
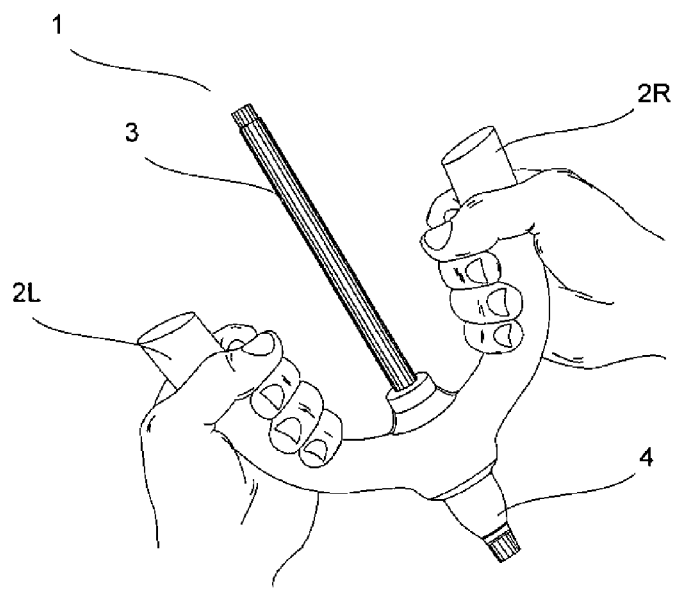

It is also possible to describe the said two embodiment of the present invention as follows: The first embodiment relates to a handle to which a pen is permanently attached that comprises a handle with two arms (2R) (2L). Wherein each of the said arms (2R) (2L) is shaped like as a curved pole wherein one end of which is attached to the external lower part of the central part of the handle. Thus, the user can grasp the said handle by the said arms (2R) (2L) with both hands and to execute the writing action. FIGS. 1-3 describe the said handle.

In addition, as to the first embodiment, it is clear from the above explanation and also from the figures that accompany this patent application that the arms (2R) (2L) of the symmetric rigid writing device (1) are symmetric and that said writing utensil (3) constitutes a central part of the writing device (1).

In addition, it is understood from the above that the arms (2L) (2R) and the writing utensil (3) of the writing device (1) are rigid.

The fact that the device (1) is rigid and symmetric causes the user to hold his or her hands in a symmetric and steady manner while writing, whereby the two hands actually act as a single limb that operates in a harmonious and symmetric manner and the motion of the hands is like the motion of a single limb. This creates an illusion that the two hands are, in fact, a single limb acting in a uniform manner. It is known that the action or movement of one hand activates parts of the opposite side of the brain. Writing with the device (1) in a rigid, steady and symmetric manner activates both sides of the brain simultaneously.

The second embodiment relates to a symmetric and rigid handle (10) into which a pen can be integrated that comprise a central part (12) and two arms (14R) (14L). Wherein the central part (12) is shaped like a cylinder with a vertical cavity (13). The vertical cavity (13) has an upper opening and a bottom opening. Wherein each of the said arms (14R) (14L) is shaped like a curved pole wherein one end of which is attached to the external lower part of the said central part (12). Thus, it is possible to insert a pen into the vertical cavity (13), to grasp the handle (10) by the said arms (14R) (14L) with both hands and to execute the writing action. FIGS. 5A-5C describe the said handle (10). In addition, as to the second embodiment, it is clear from the above explanation and also from the figures that accompany this patent application that the handle (10) and its arms (14R) (14L) are symmetric and rigid.

The fact that the handle (10) and arms (R14) (L14) are rigid and symmetric cause the same effect described above for the device (1).

Figure 4:
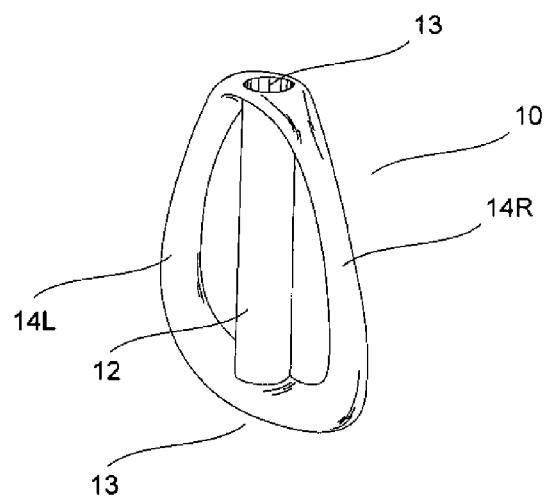
FIG. 4 depicts the handle (10).

It is understood from the above mentioned and from the drawing of FIG. 1 that each arm (2L) (2R) of the symmetric rigid writing device (1) has a bottom end and an upper end and that the writing utensil (3) is positioned at the center between said arms. The bottom end of each arm is attached to the lower part of the writing utensil and the upper end of each arm is attached to the upper part of the writing utensil and whereby, after being attached to the writing utensil, these arms (2L) (2R) constitute a closed ring. The term closed ring is not related only to a rounded ring but also to the structure as described for example in FIG. 1. In addition, the horizontal distance between the writing utensil and the upper part of each of said arms is shorter than the horizontal distance between said writing utensil and the lower part of each of said arms. Thus, a user may grasp said writing device by said arms with both hands so that when grasping said arms, the user's hands are slightly apart and enable the user to see what he or she is writing when using the writing device. The same is understood as to the rigid handle (10) as explained above and described in FIGS. 4 and 5.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A symmetric rigid writing device that comprises two arms and a writing utensil; wherein said writing utensil is permanently attached to said arms; wherein said arms and said writing utensil are made of rigid materials; wherein said arms are symmetric; wherein each of said arms is shaped like a curved pole and wherein each of said arms has a bottom end and an upper end; wherein said writing utensil is positioned at center between said arms; wherein said bottom end of each said arms is attached to a lower part of said writing utensil and wherein said upper end of each said arms is attached to an upper part of said writing utensil and wherein, after being attached to said writing utensil, said arms constitute a closed ring; wherein horizontal distance between said writing utensil and an upper part of each of said arms is shorter than horizontal distance between said writing utensil and a lower part of each of said arms; wherein a user may grasp said writing device by said arms with both hands and execute a writing action.

2. A symmetric, rigid handle into which a pen can be integrated that comprises a central part and two arms; wherein the central part is shaped like a cylinder with a vertical cavity; wherein said arms are symmetric; wherein each of said arms is shaped like a curved pole and wherein each of said arms has a bottom end and an upper end; wherein said central part is positioned at center between said arms; wherein said bottom end of each said arms is attached to a lower part of said central part and wherein said upper end of each said arms is attached to an upper part of said central and wherein, after being attached to said central part, said arms constitute a closed ring; wherein said handle is made of rigid materials; wherein horizontal distance between said central part and an upper part of each of said arms is shorter than horizontal distance between said central part and a lower part of each of said arms; wherein a user may insert a pen into the vertical cavity, grasp the handle by said arms with both hands, and execute a writing action.

* * * * *